(12) United States Patent
Watarai (10) Patent No.: US 8,235,408 B2
(45) Date of Patent: Aug. 7, 2012

(54) BICYCLE SHIFT CONTROL DEVICE THAT RESPONDS TO A MANUALLY OPERATED SWITCH

(75) Inventor: Etsuyoshi Watarai, Sakai (JP)

(73) Assignee: Shimano, Inc., Sakai (JP)

( * ) Notice: Subject to any disclaimer, the term of this patent is extended or adjusted under 35 U.S.C. 154(b) by 884 days.

(21) Appl. No.: 11/552,759

(22) Filed: Oct. 25, 2006

(65) Prior Publication Data

US 2007/0296176 A1 Dec. 27, 2007

(30) Foreign Application Priority Data

Jun. 22, 2006 (JP) ................................ 2006-172780

(51) Int. Cl.
*B62M 25/08* (2006.01)
(52) U.S. Cl. ............. 280/260; 280/261; 701/52; 701/56
(58) Field of Classification Search .................. 280/260, 280/261; 701/51, 52, 55, 56
See application file for complete search history.

(56) References Cited

U.S. PATENT DOCUMENTS

| | | | | |
|---|---|---|---|---|
| 4,490,127 A * | 12/1984 | Matsumoto et al. | .......... | 474/110 |
| 5,213,548 A | 5/1993 | Colbert et al. | | |
| 5,681,234 A * | 10/1997 | Ethington | ........................ | 474/70 |
| 6,959,941 B2 * | 11/2005 | Takeda et al. | .................. | 280/261 |
| 7,062,980 B2 * | 6/2006 | Takamoto et al. | .......... | 73/862.31 |
| 7,089,100 B2 * | 8/2006 | Takeda et al. | ..................... | 701/35 |
| 7,207,912 B2 * | 4/2007 | Takeda et al. | .................... | 474/78 |
| 7,288,038 B2 * | 10/2007 | Takeda et al. | .................... | 474/80 |
| 7,379,798 B2 * | 5/2008 | Takeda et al. | .................... | 701/29 |
| 2003/0100392 A1 | 5/2003 | Ichida | | |
| 2005/0253356 A1 | 11/2005 | Matsueda et al. | | |
| 2005/0280244 A1* | 12/2005 | Watarai | ....................... | 280/288.4 |

FOREIGN PATENT DOCUMENTS

| | | |
|---|---|---|
| JP | 05-319355 A | 12/1993 |
| JP | 08-113183 A | 5/1996 |
| JP | 2003-185008 A | 7/2003 |

* cited by examiner

*Primary Examiner* — Paul N Dickson
*Assistant Examiner* — Wesley Potter
(74) *Attorney, Agent, or Firm* — James A. Deland (57) ABSTRACT

A bicycle shift control device comprises a traveling state detecting circuit that detects a traveling state of the bicycle and a manually operated switch that outputs a switch signal. A shift control circuit provides a control signal, in response to the switch signal provided by the operation of the switch, for setting the speed stage of a bicycle transmission to correspond to the range of traveling states that contains the detected traveling state.

14 Claims, 7 Drawing Sheets

BICYCLE SHIFT CONTROL DEVICE THAT RESPONDS TO A MANUALLY OPERATED SWITCH

BACKGROUND OF THE INVENTION

The present invention is directed to bicycles and, more particularly, to a bicycle shift control device that responds to a manually operated switch.

Bicycle transmissions typically include internal transmissions and external transmissions. Internal transmissions usually comprise an internal hub transmission that employs one or more planetary gear mechanisms that set a plurality of gear ratios corresponding to speed stages. A manually operated shift control device for internal hub transmissions may comprise first and second manually operated levers, wherein the first lever is used to set progressively higher gear ratios, and the second lever is used to set progressively lower gear ratios.

External transmissions usually comprise front and/or rear derailleurs that engage a chain with one or more sprockets that rotate with the pedal crank or the rear wheel. A common external transmission comprises a front derailleur that engages a chain with one of a plurality of front sprockets that rotate with the pedal crank, and a rear derailleur that engages the chain with one of a plurality of rear sprockets that rotate with the rear wheel. Manually operated shift control devices for such transmissions may comprise a separate manually operated shift control device for each derailleur, wherein each shift control device includes first and second manually operated levers. Such a shift control device arrangement is disclosed in Japanese Laid Open Patent Application No. 5-319355. In this arrangement, the rear shift control device is mounted at the right side of the bicycle handlebar, and the front shift control device is mounted at the left side of the handlebar. For the rear shift control device, the first lever is operated with the index finger to upshift the rear derailleur, and the second lever is operated with the thumb to downshift the derailleur. By contrast, for the front shift control device, the first lever is operated with the index finger to downshift the front derailleur, and the second lever is operated with the thumb to upshift the front derailleur.

Since all four levers must be skillfully used taking into account the opposite operating nature of the front and rear shift control devices, a novice rider may have trouble understanding which shift lever should be used to set a desired speed stage. To overcome this problem, some bicycles are equipped with automatic shift control devices that automatically cause a control device to set the front and rear derailleurs to the proper front and rear sprockets, respectively, according to bicycle speed. However, since such automatic operation is performed without regard to the intentions of the rider, the speed stage of the transmission may be changed against the intentions of the rider. Such unintended changes also result in unexpectedly increased or decreased pedaling resistance, thus causing further discomfort to the rider.

SUMMARY OF THE INVENTION

The present invention is directed to various features of a bicycle shift control device. In one embodiment, a bicycle shift control device comprises a traveling state detecting circuit that detects a traveling state of the bicycle and a manually operated switch that outputs a switch signal. A shift control circuit provides a control signal, in response to the switch signal provided by the operation of the switch, for setting the speed stage of a bicycle transmission to correspond to the range of traveling states that contains the detected traveling state. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
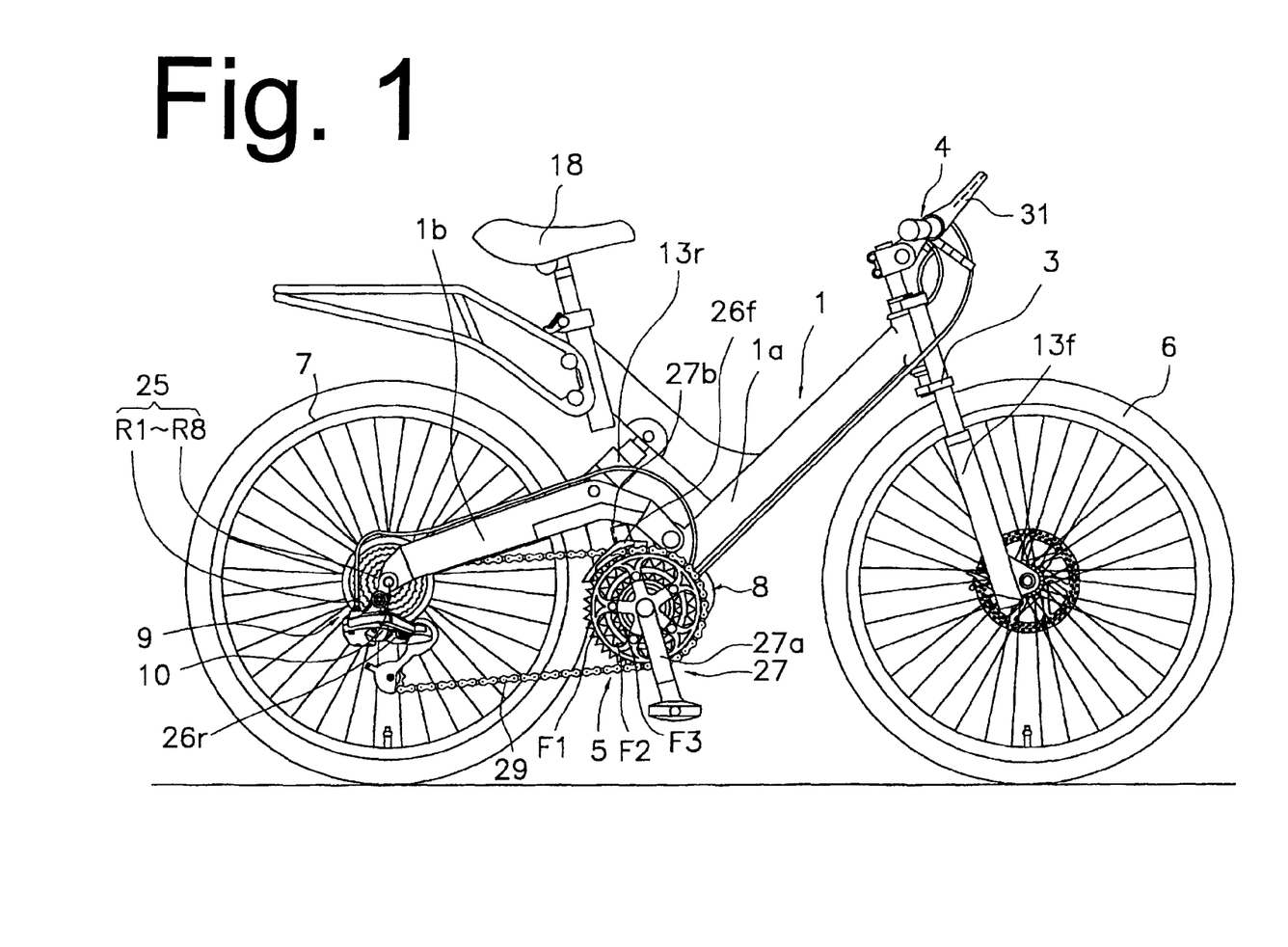
FIG. 1 is a side view of a particular embodiment of a bicycle.

FIG. 1 is a side view of a particular embodiment of a bicycle 1. Bicycle 1 is a mountain bicycle that comprises a frame body 1a and a swing arm 1b pivotably connected to the rear of frame body 1a via a rear suspension 13r. Frame body 1a and swing arm 1b each may be constructed by welding together tubing having noncircular cross-sections. A front fork 3 is mounted to the front of frame body 1a for rotation around an inclined axis, and a handlebar assembly 4 is mounted to the top of front fork 3. A saddle 18 is mounted to the upper rear part of frame body 1a, a drive mechanism 5 is mounted to the lower part of frame body 1a, a front wheel 6 is rotatably mounted to front fork 3 through a front suspension 13f, and a rear wheel 7 having a hub dynamo 10 is rotatably mounted to the rear of swing arm 1b. Hub dynamo 10 houses an alternating current generator 19 (FIG. 4) for generating electricity from the rotation of rear wheel 7. A front transmission 8 including an electrically operated front derailleur 26f is mounted to the lower rear part of frame body 1a, and a rear transmission 9 including an electrically operated rear derailleur 26r is mounted to the rear of swing arm 1b.

Figure 2:
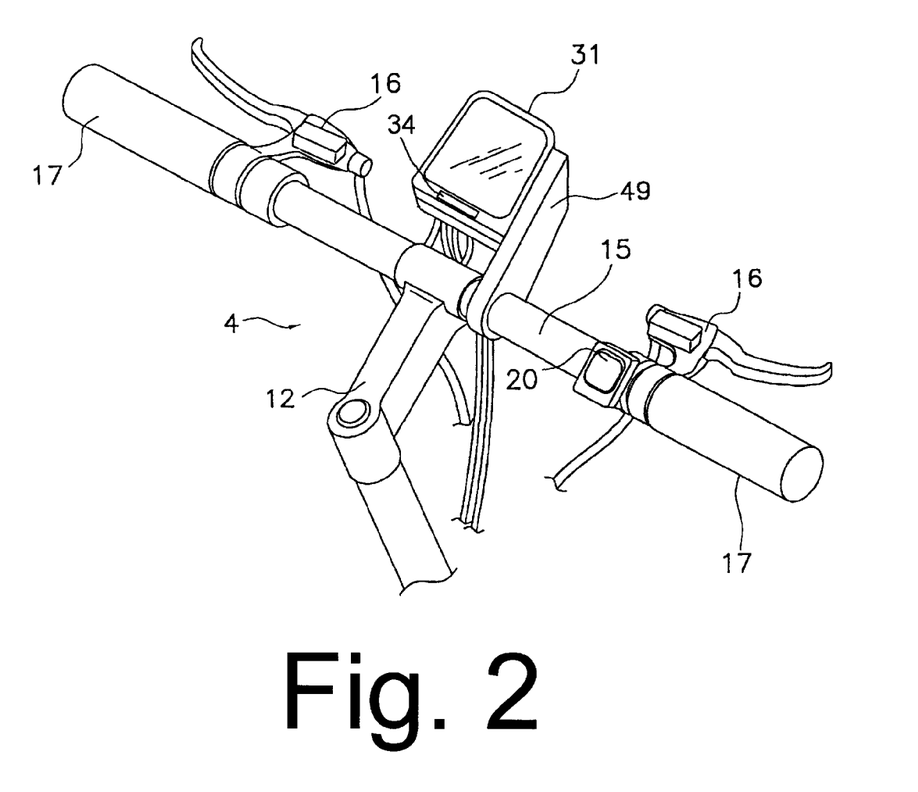
FIG. 2 is a more detailed view the handlebar assembly.
Figure 3:
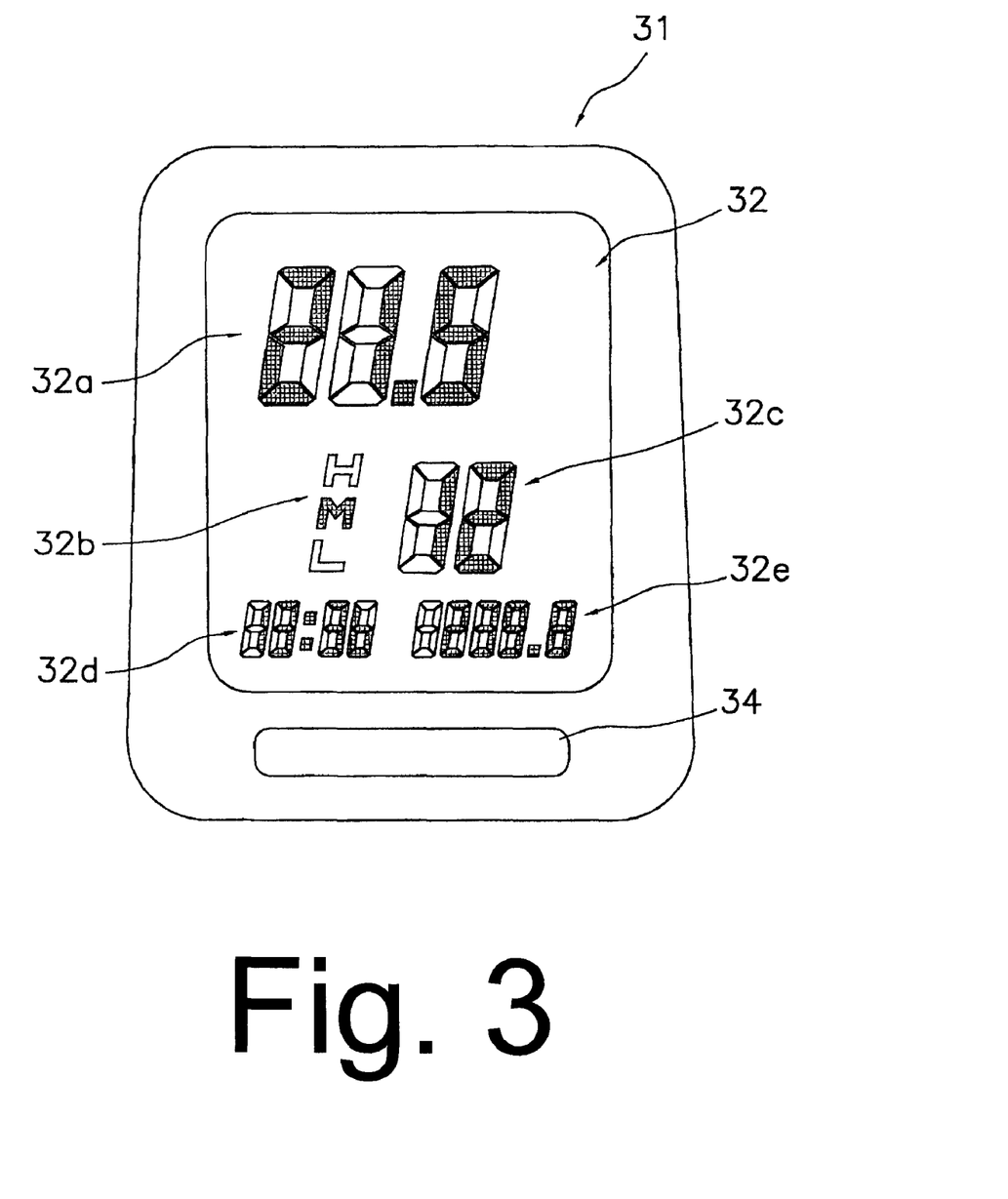
FIG. 3 is an illustration of items displayed on a computer display.

As shown in FIG. 2, handlebar assembly 4 comprises a handle stem 12 mounted to the top of front fork 3 and a handlebar 15 mounted to the top of handle stem 12. Brake lever assemblies 16 and grips 17 are mounted at the opposite ends of handlebar 15. The right side brake lever assembly 16 includes a switch 20 for manually controlling the operation of front derailleur 26f and rear derailleur 26r in a manner described below. A display device 31 in the form of a cycle computer is mounted on handlebar 15 via a bracket 49. As shown in FIG. 3, display device 31 has a segmented liquid crystal display portion 32. Liquid crystal display (LCD) portion 32 is provided with a speed display area 32a disposed at an upper portion thereof, a shift mode display area 32b positioned below speed display area 32a, a speed stage display area 32c positioned to the right of shift mode display area 32b, a time display area 32d positioned below shift mode display area 32b, and a distance display area 32e disposed below speed stage display area 32c. Shift mode display area 32b indicates shift modes such as a high-speed shift mode (H), a medium-speed shift mode (M), and a low speed shift mode (L). In the high-speed shift mode, shift timings are shifted towards higher speeds compared to the medium-speed shift mode. In the low-speed shift mode, shift timings are shifted towards lower speeds compared to the medium-speed mode. An operating button 34 for performing editing of displayed data and other operations is disposed below LCD portion 32. FIG. 3 shows LCD portion indicating the current state of various traveling conditions of the bicycle. For example, a speed of "21.5" kilometers per hour is displayed at the speed display area 32a, the letter "M" indicating medium-speed shift mode is displayed at the shift mode display area 32b, the speed stage "12" is displayed at the speed stage display area 32c, the time "3:36" is displayed in time display area 32d, and "239.8" is displayed in distance display area 32e.

As shown in FIG. 1, drive mechanism 5 comprises a crank 27 rotatably mounted at the bottom bracket of frame body 1a, front and rear transmissions 8 and 9, and a chain 29. Crank 27 comprises a right crank arm 27a and a left crank arm 27b. Front transmission 8 comprises, for example, three (M=3) front sprockets F1-F3 and front derailleur 26f, wherein front sprockets F1-F3 are mounted to right crank arm 27a, and front derailleur 26f is mounted on frame body 1a. Rear transmission 9 comprises, for example, a multiple sprocket assembly 25 having eight (N=8) rear sprockets R1-R8 and rear derailleur 26r, wherein multiple sprocket assembly 25 is mounted to rear wheel 7, and rear derailleur 26r is mounted to the back of swing arm 1a. In FIG. 1, the number of sprockets R1-R8 is not depicted exactly for simplicity of illustration.

Front sprockets F1-F3 are arranged in the order of a decreasing number of teeth, wherein front sprocket F1 is the laterally outermost front sprocket having the greatest number of teeth, and front sprocket F3 is the laterally innermost front sprocket having the least number of teeth. Rear sprockets R1-R8 also are arranged in the order of a decreasing number of teeth, wherein rear sprocket R1 is the laterally innermost rear sprocket having the most number of teeth, and rear sprocket R8 is the laterally outermost rear sprocket having the least number of teeth. To set a speed stage of the transmission formed by drive mechanism 5, chain 29 is positioned to selectively engage one of the front sprockets F1-F3, each corresponding to a shift stage of front derailleur 26f, and chain 29 is positioned to selectively engage one of the rear sprockets R1-R8, each corresponding to a shift stage of rear derailleur 26r. A controller 11 (FIG. 4) controls the operation of front derailleur 26f and rear derailleur 26r in response to signals received from shift switch 20 in a manner described below.

An example of the numbers of teeth on front sprockets F1-F3 and rear sprockets R1-R8 is shown in Table 1.

TABLE 1

| SPROCKET | NUMBER OF TEETH |
|---|---|
| F1 | 46 |
| F2 | 34 |

TABLE 1-continued

| SPROCKET | NUMBER OF TEETH |
|---|---|
| F3 | 24 |
| R1 | 33 |
| R2 | 29 |
| R3 | 25 |
| R4 | 21 |
| R5 | 17 |
| R6 | 15 |
| R7 | 13 |
| R8 | 11 |

The gear ratios that result when chain 29 engages the various combinations of front sprockets F1-F3 and rear sprockets R1-R8 is shown in Table 2. Each gear ratio may be considered a speed stage of the bicycle transmission formed by drive mechanism 5. Higher numbered gear ratios are more suitable for high-speed traveling.

TABLE 2

| | R1 | R2 | R3 | R4 | R5 | R6 | R7 | R8 |
|---|---|---|---|---|---|---|---|---|
| F1 | 1.394 | 1.586 | 1.84 | 2.190 | 2.706 | 3.067 | 3.538 | 4.182 |
| F2 | 1.030 | 1.172 | 1.36 | 1.619 | 2 | 2.267 | 2.615 | 3.091 |
| F3 | 0.727 | 0.828 | 0.96 | 1.143 | 1.412 | 1.6 | 1.846 | 2.182 |

In Table 2, there are combinations of speed stages among the twenty-four (M×N) shift stage combinations of the front sprockets F1-F3 and rear sprockets R1-R8 in which the gear ratios do not progress smoothly from one sprocket combination to another sprocket combination. For example, the transition from sprocket combination (F3, R8) to sprocket combination (F2, R1) provides neither an increase in gear ratio nor a smooth decrease in gear ratio. Consequently, in this embodiment, twelve speed stages in which shift ratios smoothly increase or decrease are selected from the twenty-four possible shift stage combinations as shown in Table 3, and controller 11 controls front derailleur 26f and rear derailleur 26r to select among these speed stages according to bicycle speed.

TABLE 3

| | R1 | R2 | R3 | R4 | R5 | R6 | R7 | R8 |
|---|---|---|---|---|---|---|---|---|
| F1 | | | | | NINTH SPEED | TENTH SPEED | ELEVENTH SPEED | TWELFTH SPEED |
| F2 | | | FIFTH SPEED | SIXTH SPEED | SEVENTH SPEED | EIGHTH SPEED | | |
| F3 | FIRST SPEED | SECOND SPEED | THIRD SPEED | FOURTH SPEED | | | | |

A crank rotation sensor 24 (FIG. 4) is provided for sensing the rotation of crank 27. The presence or absence of rotation of crank 27 ordinarily is used in part to control the operation of front and rear transmissions 8 and 9. For example, derailleurs cannot shift properly when crank 27 is stationary, so any requested operation of a derailleur may be delayed until crank 27 is rotating. Crank rotation sensor 24 typically comprises a reed switch (not shown) mounted to frame body 1a within the rotation radius of crank 27, and one or more magnets (not shown) mounted to one or both of the crank arms 27a and 27b so that reed switch 23 provides a pulse whenever a magnet passes by. In this embodiment, four such magnets may be used to provide four pulses for each rotation of crank 27.

Controller 11 controls various components including the front and rear transmissions 8 and 9. For example, controller 11 controls front and rear transmissions 8 and 9 in response to the operation of shift switch 20 and bicycle speed. Controller 11 may be mounted, for example, on the bottom bracket of frame body 1a in proximity to crank sensor 24 and front derailleur 26f, and it is connected to alternating current generator 19. The electrical current generated by alternating current generator 19 powers controller 11, and controller 11 uses the supplied electrical current to control the operation of front derailleur 26f and rear derailleur 26r. Since controller 11 is disposed on the bottom bracket of frame body 1a, it is fairly close to alternating current generator 19. As a result, a short power cable may be used to connect controller 11 to alternating current generator 19, and the communication of power between the two may be carried out with high efficiency.

Figure 4:
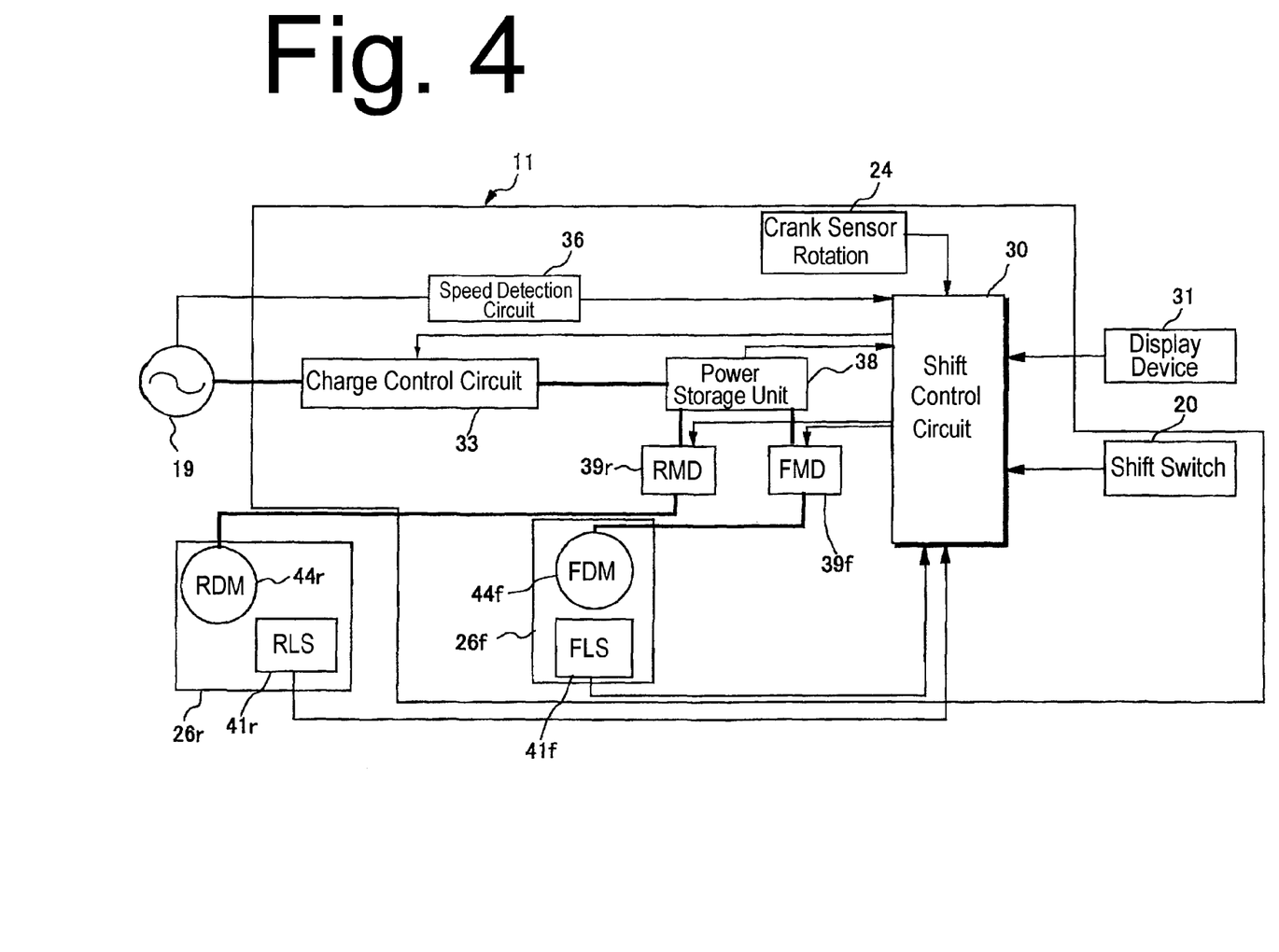
FIG. 4 is a schematic block diagram of a computer control device for components of the bicycle.

As shown in FIG. 4, controller 11 includes a shift control circuit 30 that comprises an information processing unit in the form of a microcomputer including a CPU, memory, I/O interface and the like. A number of modules are connected to shift control circuit 30. Such modules include a traveling state detection circuit in the form of a speed detection circuit 36 for generating pulsed velocity signals from the alternating current signal output from alternating current generator 19, a charge control circuit 33, a power storage unit 38, crank sensor 24, a control device such as a front motor driver (FMD) 39f for operating a front derailleur motor (FDM) 44f for front derailleur 26f, another control device such as a rear motor driver (RMD) 39r for operating a rear derailleur motor (RDM) 44r for rear derailleur 26r, a front operating location sensor (FLS) 41f that provides signals indicating the current operating position of front derailleur 26f, a rear operating location sensor (RLS) 41r that provides signals indicating the current operating position of rear derailleur 26r, shift switch 20, and display device 31.

Charge control circuit 33 rectifies the alternating current output from alternating current generator 19 into direct current. Power storage unit 38 may comprise, for example, a large-capacity condenser such as an electric double layer capacitor, and it stores the direct current output from charge control circuit 33. Instead of a condenser, power storage unit 38 may comprise a secondary battery such as a nickel-cadmium battery, a lithium ion battery, a nickel hydrogen battery, or some other charge storage device.

In operation, alternating current generator 19 of hub dynamo 10 generates electricity as the bicycle is pedaled, and this electricity is supplied to shift control circuit 30, with power being stored by power storage unit 38. Power from power storage unit 38 is turned on and off by control signals from shift control circuit 30. Shift control circuit 30 also provides control signals to motor drivers 39f and 39r which cause motor drivers 39f and 39r to output motor drive signals for driving motors 44f and 44r provided with derailleurs 26f and 26r.

Since alternating current generator 19 is disposed on rear wheel 7, power storage unit 38 can be charged simply by turning the pedals, with the bicycle remaining stationary, by lifting the rear wheel. Thus, it is a simple matter to at least partially charge power storage unit 38 by turning the pedals to allow setting up of the electronically operated transmissions and the information displayed on display 32.

Derailleurs 26f and 26r are controlled according to the operation of switch 20 and the bicycle speed as calculated from speed detection circuit 36. More specifically, when switch 20 is operated, shift control circuit 30 operates front and rear derailleurs 26f and 26r so that drive mechanism 5 is set to the appropriate speed stage according to bicycle speed. Maximum and minimum speed values for each speed stage are stored in a memory associated with shift control circuit 30. As noted previously, there are three shift modes. The predetermined bicycle speed values for medium-speed shift mode are shown in Table 4, the predetermined bicycle speed values for low-speed shift mode are shown in Table 5, and the predetermined bicycle speed values for high-speed shift mode are shown in Table 6

TABLE 4

| | R1 (km/h) | R2 (km/h) | R3 (km/h) | R4 (km/h) | R5 (km/h) | R6 (km/h) | R7 (km/h) | R8 (km/h) |
|---|---|---|---|---|---|---|---|---|
| F1 | | | | | 19-22 | 22-26 | 26-30 | 30- |
| F2 | | | 10-12 | 12-14.5 | 14.5-16.5 | 16.5-19 | | |
| F3 | 0-5 | 5-7 | 7-8.5 | 8.5-10 | | | | |

TABLE 5

| | R1 (km/h) | R2 (km/h) | R3 (km/h) | R4 (km/h) | R5 (km/h) | R6 (km/h) | R7 (km/h) | R8 (km/h) |
|---|---|---|---|---|---|---|---|---|
| F1 | | | | | 18-21 | 21-25 | 25-29 | 29- |
| F2 | | | 9-11 | 11-13.5 | 13.5-15.5 | 15.5-18 | | |
| F3 | 0-4 | 4-6 | 6-7.5 | 7.5-9 | | | | |

TABLE 6

| | R1 (km/h) | R2 (km/h) | R3 (km/h) | R4 (km/h) | R5 (km/h) | R6 (km/h) | R7 (km/h) | R8 (km/h) |
|---|---|---|---|---|---|---|---|---|
| F1 | | | | | 21-24 | 24-28 | 28-32 | 32- |
| F2 | | | 12-14 | 14-16.5 | 16.5-18.5 | 18.5-21 | | |
| F3 | 0-7 | 7-9 | 9-10.5 | 10.5-12 | | | | |

For example, in medium-speed mode, the range of bicycle speeds for the third speed stage is 7 kilometers per hour or more and less than 8.5 kilometers per hour. If shift switch 20 is operated when the bicycle speed is 7 kilometers per hour or more and less than 8.5 kilometers per hour, then shift control circuit 30 provides control signals to front and rear motor drivers 39f and 39r to set front and rear derailleurs 26f and 26r to the positions corresponding to third speed (i.e., front derailleur 26f is positioned to engage chain 29 with front sprocket F3, and rear derailleur 26r is positioned to engage chain 29 with rear sprocket R3.

Figure 5:
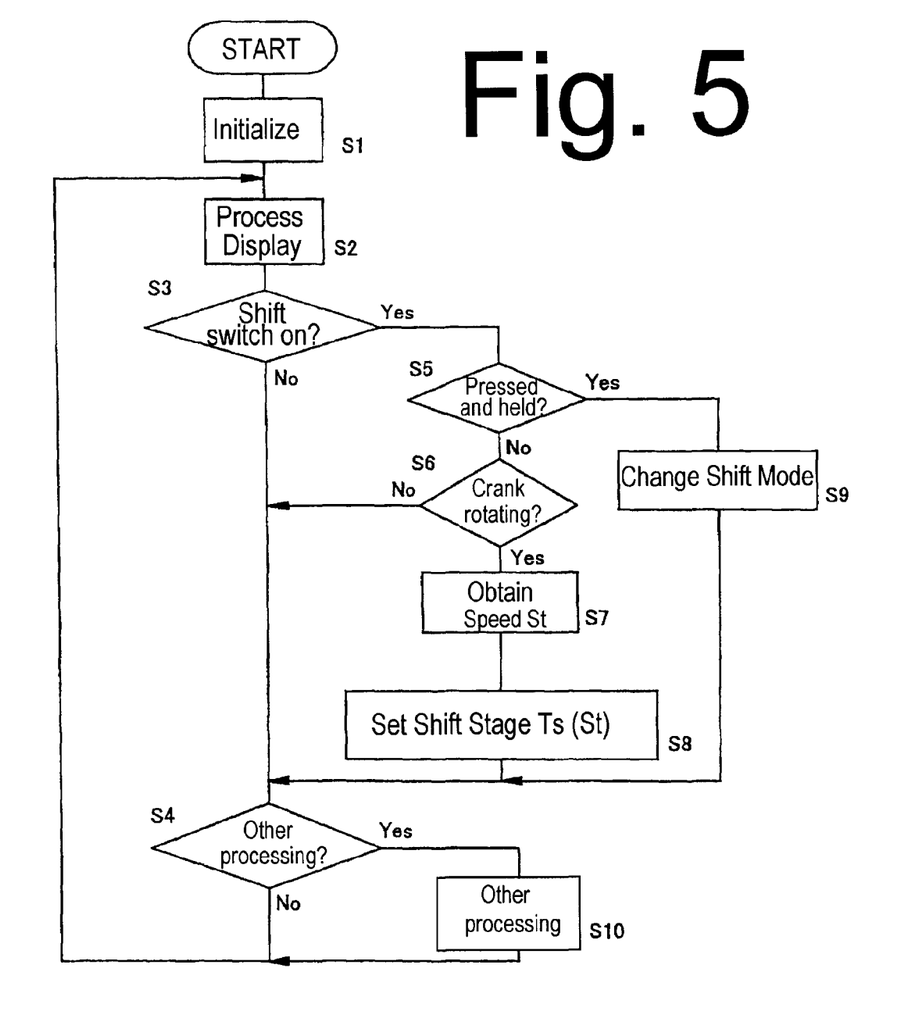
FIG. 5 is a flow chart of a particular embodiment of a routine for controlling the operation of the front and rear derailleurs.

FIG. 5 is a flow chart of a particular embodiment of a routine for controlling the operation of drive mechanism 5. When power is applied from power storage unit 38 to shift control circuit 30, initialization is performed in a step S1. For example, the shift mode may be set to medium-speed mode. Then, display processing is performed in a step S2 to transmit various display data to display device 31, and the appropriate data is displayed in a corresponding display area 32a to 32e of LCD portion 32. For example, when speed data is communicated from shift control circuit 30 to display 31, speed is displayed in speed display area 32a, and when shift mode data is communicated from shift control circuit 30 to display 31, the appropriate symbol H, M or L indicating the current shift mode is displayed in shift mode display area 32b. When speed stage data is communicated from shift control circuit 30 to display 31, a value indicating any of the 1 to 12 speed stages is displayed in speed stage display area 32c.

It is then determined in a step S3 whether or not shift switch 20 has been operated. If not, then the process proceeds from step S3 to a step S4, wherein it is determined whether or not instructions for other processing (such as derailleur adjustment) have been issued. If not, then the process returns to step S2. However, if instructions for other processing have been issued, then the process jumps to a step S10 to perform the other processing, and thereafter the process returns to step S2.

If it is determined in step S3 that shift switch 20 has been operated, then the process jumps from step S3 to a step S5, wherein it is determined whether or not shift switch 20 has been pressed and held for two seconds or more. In this embodiment, pressing switch 20 for two seconds or more indicates a desire to change shift modes. Accordingly, if it is determined in step S5 that shift switch 20 has been pressed for two seconds or more, then the shift mode is changed in a step S9. For example, the shift mode may be cyclically switched in the sequence of M to L to H each time shift switch 20 is pressed and held, or depending on how long shift switch 20 is pressed and held. Thereafter, the process moves to step S4.

If it is determined in step S5 that shift switch 20 has been pressed for less than two seconds, the process moves from step S5 to S6 wherein it is determined from the output of crank sensor 24 whether or not crank 27 is rotating in the traveling direction. If crank 27 is not rotating in the traveling direction, then the process returns to step S4. However, if crank 27 is rotating in the traveling direction, then the process moves from step S6 to S7 wherein a speed St detected by speed detecting circuit 36 at the moment of operation of shift switch 20 is obtained. Thereafter, front and rear derailleurs 26f and 26r are set to their specific shift stages corresponding to the speed stage Ts corresponding to the shift mode and the speed St. For example, in medium-speed mode, the proper speed stage Ts is determined from speed St and the relationships shown in Table 4. Thus, if the detected speed St is 15 kilometers per hour, front derailleur 26f is set to shift stage F2 and rear derailleur 26r is set to shift stage R5 to correspond to the seventh speed stage. Of course, no movements of front and rear derailleurs 26f and 26r are performed if the derailleurs already are in the proper positions. In low-speed mode, the proper speed stage Ts is determined from the current speed St and the values shown in Table 5. In high-speed mode, the proper speed stage Ts is determined from the current speed St and the values shown in Table 5. After the proper operations, if any, are performed in step S8, the process then returns to step S4.

Since the front and rear transmissions 8 and 9 are set to a specific speed stage corresponding to a traveling state by a simple operation of shift switch 20, shifting may be achieved by nothing more than a single operation of shift switch 20 whenever shifting is desired without having to operate a plurality of shift levers. Therefore, even novice riders may easily perform shift operations in accordance with their intentions. Furthermore, since the rider can select from a plurality of shift modes, an optimum shift mode that is appropriate for a rider's physical ability may be selected.

Figure 6:
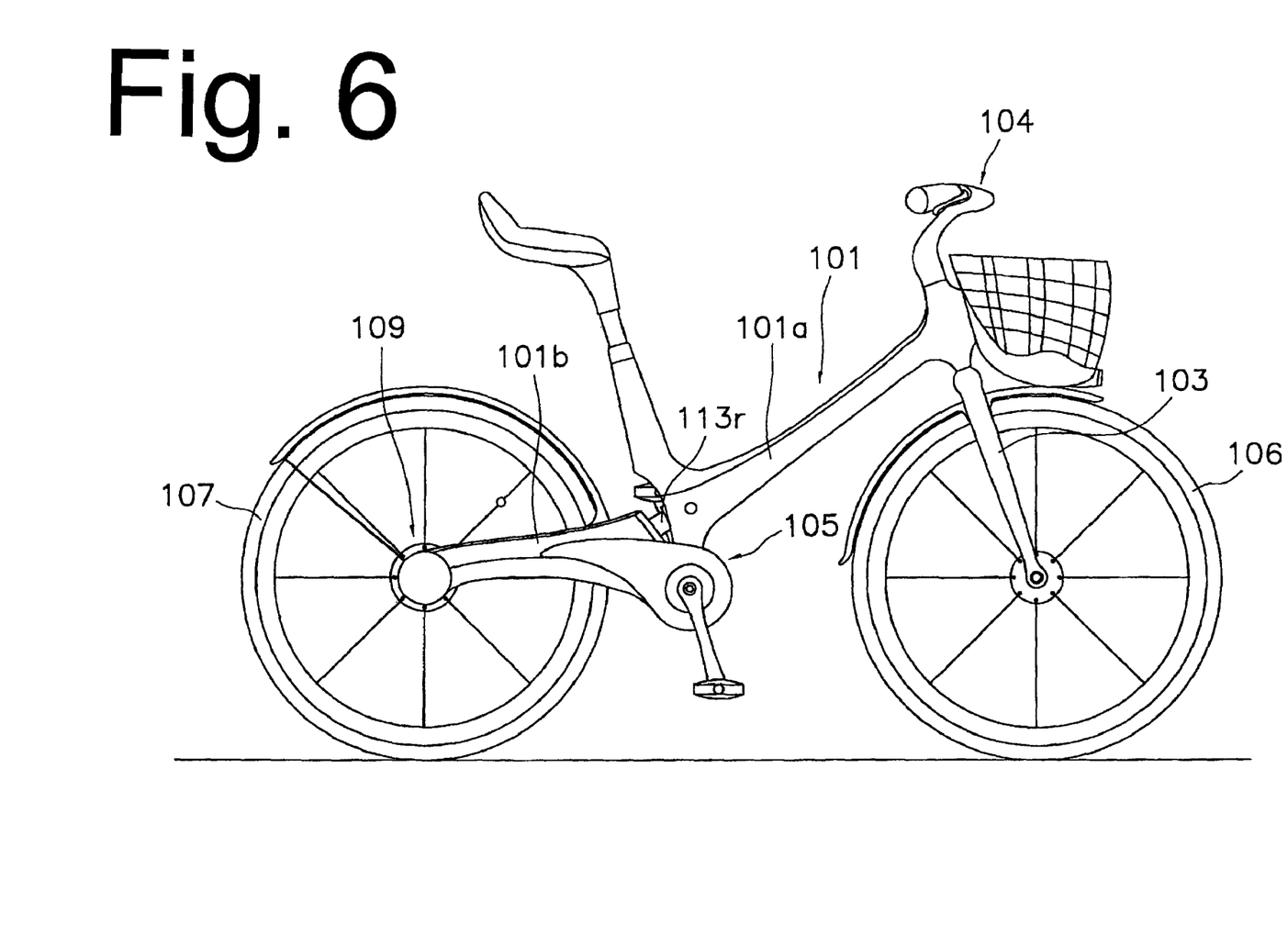
FIG. 6 is a side view of another embodiment of a bicycle.
Figure 7:
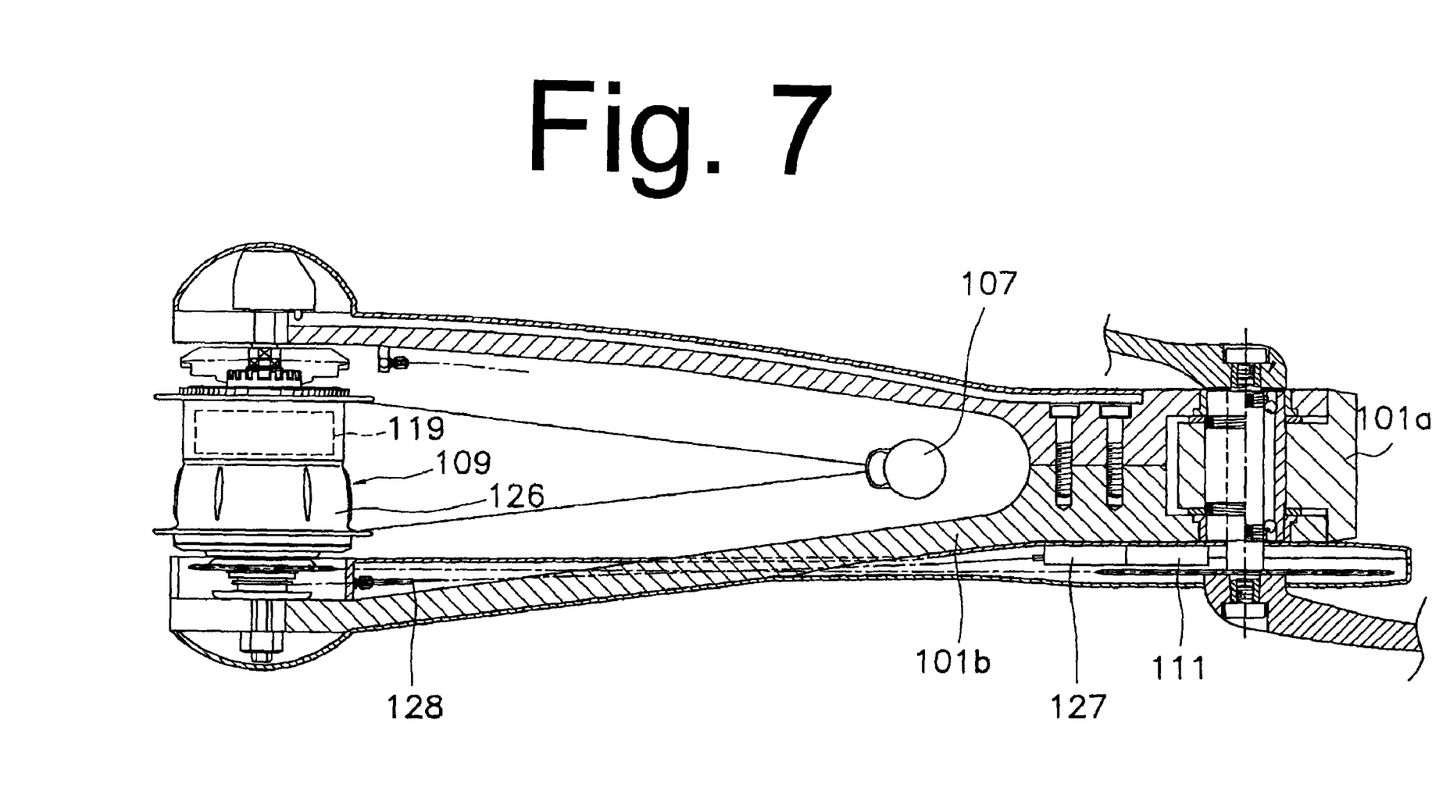
FIG. 7 is a cross sectional view of the swing arm portion of the bicycle shown in FIG. 6.

FIG. 6 is a side view of another embodiment of a bicycle, and FIG. 7 is a cross sectional view of the swing arm portion of the bicycle shown in FIG. 6. As shown in those figures, a bicycle 101 comprises a frame body 101a, a swing arm 101b pivotably connected to frame body 101a through a rear suspension 113r, a front fork 103, a handlebar assembly 104, a drive mechanism 105 including an internal transmission 109, a front wheel 106 rotatably mounted to front fork 103, a rear wheel 107 rotatably mounted with internal transmission 109, an alternating current generator 119 disposed within internal transmission 109, and a shift control circuit 111 for controlling the operation of internal transmission 109.

Internal transmission 109 comprises an internal hub transmission 126 having, for instance, eight (L=8) speed (shift) stages, and a control device such as an electric cable drive device 127. Speed threshold values corresponding to the eight speed stages are stored within a memory associated with shift control circuit 111. Electric cable drive device 127 includes a motor and a cable positioning mechanism (not shown). Electric cable drive device 127 causes internal hub transmission 126 to perform shift operations to selected ones of the eight speed stages through a shift cable 128. In this embodiment, shift control circuit 111 and electric cable drive device 127 are mounted on swing arm 101b.

A shift switch similar to that shown for the previous embodiment is provided on handlebar assembly 104. When the shift switch is operated, shift control circuit 111 sets internal hub transmission 126 to a specific speed stage corresponding to the bicycle speed. In this embodiment, bicycle speed may be detected as in the first embodiment by performing waveform-shaping on the alternating current signal output from alternating current generator 119.

While the above is a description of various embodiments of inventive features, further modifications may be employed without departing from the spirit and scope of the present invention. For example, while bicycle speed was detected using outputs from an alternating current generator, many other ways of detecting bicycle speed are known. For example, bicycle speed may be detected using a reed switch disposed on a first member of the bicycle (e.g., front fork 3), and a magnet or the like disposed on a second member of the bicycle (e.g., front wheel 6) that moves relative to the first member. While a push-button switch was used as shift switch 20, a lever-type switch, a rocker switch or a number of other switches may be used instead. While shift control circuit 30 and other elements were mounted on the bottom bracket portion of frame body 1b, the various components and/or functions may be distributed as desired, such as mounting one or more components on front derailleur 26f and/or rear derailleur 26r to simplify wiring operations.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle shift control apparatus for a bicycle with a control device used to set a plurality of speed stages of a bicycle transmission, wherein each speed stage corresponds to a range of traveling states of the bicycle, wherein the apparatus comprises:
   a traveling state detecting circuit that detects a traveling state of the bicycle;
   a manually operated switch that provides a switch signal indicating that the switch has been operated; and
   a control circuit that receives signals from the traveling state detecting circuit and the switch;
   wherein, after power is applied to the control circuit, after initialization of the control circuit is complete and the control circuit is ready for processing signals from riding operation of the bicycle, after a shift mode of the control circuit is set to a selected shift mode and while the control circuit is in the selected shift mode, when the control circuit thereafter receives the switch signal from the manually operated switch indicating that the switch has been operated, the receipt of the switch signal from the manually operated switch causes the control circuit, while maintaining the shift mode the control circuit was in at the time the switch signal was received:
      (i) to determine a proper speed stage by determining which range of traveling states contains the traveling state of the bicycle detected by the traveling state detecting circuit, wherein the proper speed stage that corresponds to the range of traveling states that contains the traveling state of the bicycle detected by the traveling state detecting circuit; and
      (ii) to automatically provide a control signal to set the bicycle transmission to the proper speed stage.

2. The apparatus according to claim 1 wherein the traveling state is bicycle speed.

3. The apparatus according to claim 2 wherein the traveling state detecting circuit detects bicycle speed from signals output from an alternating current generator.

4. The apparatus according to claim 2 further comprising a memory that stores maximum and minimum speed values for each speed stage, and wherein the control circuit determines the proper speed stage by determining which speed stage corresponds to the range of traveling states that includes the bicycle speed detected by the traveling state detecting circuit.

5. The apparatus according to claim 4 wherein the bicycle speed used to determine the proper speed stage is the bicycle speed detected at the time the switch was operated.

6. The apparatus according to claim 2 wherein the traveling state is bicycle wheel speed.

7. The apparatus according to claim 1 wherein the switch is a push-button switch that provides the switch signal when the push-button switch is pushed.

8. The apparatus according to claim 1 wherein the bicycle transmission is an internal hub transmission.

9. The apparatus according to claim 1 wherein the bicycle transmission is a derailleur transmission.

10. The apparatus according to claim 9 wherein the derailleur transmission comprises:
    a front derailleur that sets a chain to selected ones of a plurality of front shift stages; and
    a rear derailleur that sets the chain to selected ones of a plurality of rear shift stages;
    wherein each speed stage of the plurality of speed stages corresponds to the combination of a front shift stage and a rear shift stage.

11. The apparatus according to claim 1 further comprising the control device that receives the control signal and provides a signal that sets the bicycle transmission to the proper speed stage.

12. The apparatus according to claim 11 wherein the control device comprises a motor driver.

13. The apparatus according to claim 1 wherein the apparatus has only one switch that is the only switch that causes the control circuit to determine the proper speed stage that corresponds to the range of traveling states that contains the traveling state of the bicycle detected by the traveling state detecting circuit.

14. The apparatus according to claim 1 wherein the manually operated switch is a single switch, and is the only switch that causes the control circuit to determine the proper speed stage in both an increasing speed stage direction and a decreasing speed stage direction.

* * * * *